United States Patent [19]
O'Connor

[11] 3,819,221
[45] June 25, 1974

[54] AUTOMOBILE DOOR BUTTON-OPERATING IMPLEMENT

[76] Inventor: Leo A. O'Connor, 942 LeMoyne Ave., Syracuse, N.Y. 13208

[22] Filed: Jan. 9, 1973

[21] Appl. No.: 322,201

[52] U.S. Cl. .................. 294/19 R, 81/3 R, 294/1 R
[51] Int. Cl. ............................................ A47f 13/06
[58] Field of Search ............... 294/1 R, 2, 9, 10, 12, 294/14, 15, 17, 19 R, 24, 26; 7/1 R, 1 G, 1 E, 12; 49/461; 16/115; 81/1 R, 3 R, 3.1 R, 3.1 B, 3.1 C, 3.35, 3.8; 254/18, 25, 133

[56] References Cited

UNITED STATES PATENTS

| | | | |
|---|---|---|---|
| 33,784 | 11/1861 | Huston | 294/2 |
| 197,888 | 12/1877 | Pene | 294/26 X |
| 2,063,583 | 12/1936 | Christy | 294/19 R X |
| 2,227,455 | 1/1941 | Lane | 294/19 R X |
| 3,360,291 | 12/1967 | Barrett | 294/19 R |

*Primary Examiner*—Richard A. Schacher
*Assistant Examiner*—Johnny D. Cherry
*Attorney, Agent, or Firm*—Berman, Bishoff & Platt

[57] ABSTRACT

An implement to enable the operator of a motor vehicle to reach and operate a remote door locking button of the vehicle. The implement consists of an elongated bar-like member having recesses on the opposite faces of one end thereof adapted to receive a top end of a door locking button, so that the button can be depressed to locking position by exerting downward force on the implement. At its other end, the bar-like member has a laterally opening slot to receive the shank portion of the button so that the button can be raised to unlocking position by exerting an upward force or upward torque on the implement. The bar-like member is formed with a hook at the recessed end thereof so that the implement can be used to raise or lower packages in the rear part of the vehicle.

7 Claims, 8 Drawing Figures

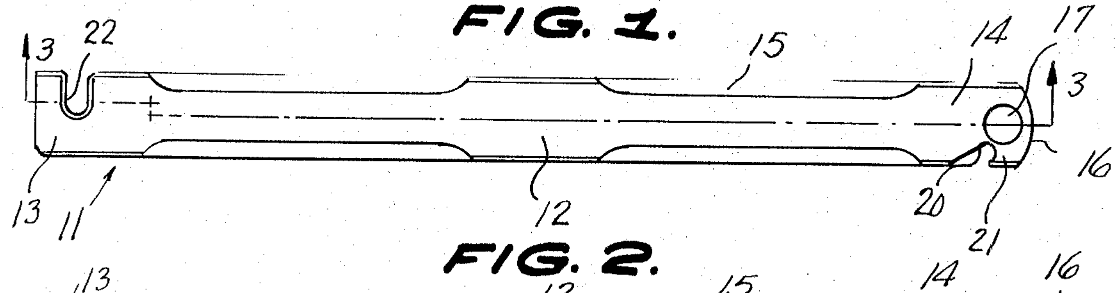
FIG. 1.
FIG. 2.
3
22
15
14
17
3
13
11
12
20
21
16
13
12
15
14
16
11
20
21
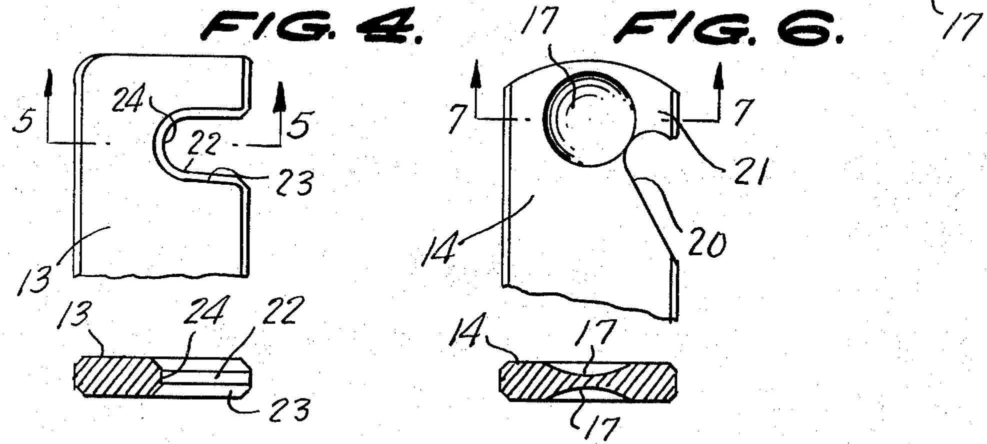
FIG. 3.
13
22
11
14
17
16
17
FIG. 4.
FIG. 6.
5
24
22
5
23
13
7
17
7
21
14
20
13
24
22
23
14
17
17
FIG. 5.
FIG. 7.
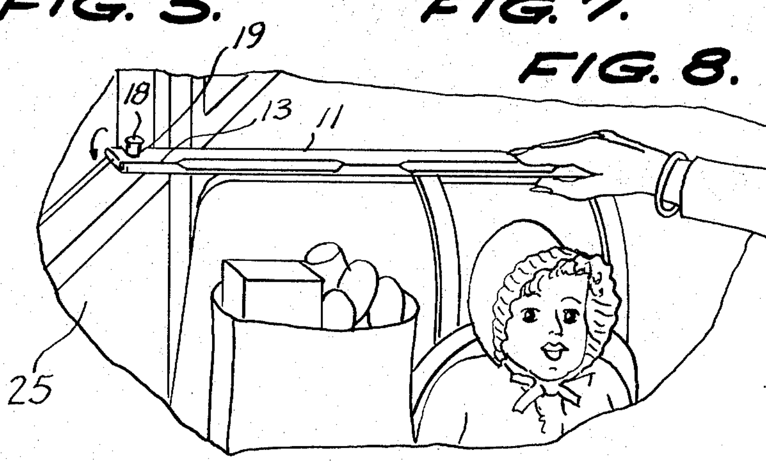
FIG. 8.
19
18
13
11
25

AUTOMOBILE DOOR BUTTON-OPERATING IMPLEMENT

This invention relates to implements for locking and unlocking doors, and more particularly, to an implement to enable the operator of a motor vehicle to reach and operate a remote door-locking button of the vehicle without the necessity of leaving the driver's seat.

A main object of the invention is to provide a novel and improved door button-operating implement for a motor vehicle, the implement being very simple in construction, being easy to use, and enabling the operator of a vehicle to actuate the locking button of a remote door of the vehicle without the necessity of unfastening his seat belt or of moving from the driver's seat.

A further object of the invention is to provide an improved vehicle door button-operating implement which enables the operator of a motor vehicle to lock or unlock a remote door of the vehicle without requiring the operator to move from driving position, thereby providing considerable convenience especially in the case where the adjacent seat is occupied by a passenger or by packages or the like, and enabling the operator to quickly lock said remote door to prevent undesired entry by persons from the outside, or to open the door, when locked to allow intended passengers to enter the vehicle, the implement enabling these operations to be performed without the necessity of releasing the driver's seat belt or otherwise requiring the driver to shift his position, the implement being inexpensive to manufacture, being relatively compact in size, being also usable for raising or lowering packages in the rear part of the vehicle, and being provided with means assuring positive engagement of the implement with the door-locking button intended to be operated.

Further objects and advantages of the invention will become apparent from the following description and claims, and from the accompanying drawings, wherein:

FIG. 1 is a top plan view of an improved door button-operating implement construction in accordance with the present invention.

FIG. 2 is a side elevational view of the implement shown in FIG. 1.

FIG. 3 is a longitudinal vertical cross-sectional view taken substantially on line 3—3 of FIG. 1.

FIG. 4 is an enlarged fragmentary plan view of one end portion of the implement shown in FIGS. 1, 2 and 3.

FIG. 5 is a transverse vertical cross-sectional view taken substantially on line 5—5 of FIG. 4.

FIG. 6 is an enlarged fragmentary plan view of the opposite end portion of the implement of FIGS. 1, 2 and 3.

FIG. 7 is a transverse vertical cross-sectional view taken substantially on line 7—7 of FIG. 6.

FIG. 8 is a fragmentary pictorial view illustrating the manner in which the driver of a vehicle can employ the implement to operate the locking button of the right front door of the vehicle without moving from the driver's seat.

Referring to the drawings, 11 generally designates an improved door button-operating implement according to the present invention. The implement 11 comprises an elongated relatively rigid bar-like member which may be approximately 16 inches in length and approximately 1¼ inches wide, having a suitable thickness, which may be of the order of one-fourth of an inch, the member being formed of any suitable material, such as hardwood, high impact plastic material, such as styrene, or the like. The longitudinal edges of the bar-like member are preferably beveled, being relatively deeply beveled at the ridges between the central portion 12 of the member and the opposite end portions 13 and 14 thereof, as shown at 15, to facilitate handling the implement.

Thus, the end portion 14 is relatively flat. Said end portion is preferably provided with a rounded end, as shown at 16. Adjacent the rounded end 16, the flat end portion 14 is formed with opposite generally spherically curved recesses 17, 17 shaped to conformably interfit with the rounded enlarged top end portion 18 of a conventional automobile door locking button 19, shown in FIG. 8.

Adjacent the recesses 17, the flat end portion 14 is formed at one side edge with an inclined notch 20 defining a hook 21.

The opposite end of the implement, shown at 13, is likewise relatively flat and is formed at a side edge with a laterally opening slot or notch 22 dimensioned to slidably receive the shank portion of a door locking button 19, the notch 22 being beveled, as shown at 23 to facilitate rotation of the implement relative to the shank of the button 19, in a manner presently to be described. The notch 22 is dimensioned to closely fit the shank of the button 19 so that the enlarged head portion 18 prevents the notch from inadvertently disengaging from the button, as will be presently explained.

As is clearly shown in FIGS. 1 and 4, the notch 22 has a semi-circular rounded inner end portion 24 conforming with the generally cylindrical contour of the shank of an automobile door locking button 19.

The notch 22 preferably is oriented to extend perpendicularly relative to the longitudinal edges of the implement.

FIG. 8 illustrates a typical manner in which the implement can be used. Thus, assuming that the operator of the vehicle desires to unlock the right front door 25 of the vehicle without the necessity of unfastening his seat belt or of shifting his position, he grasps the implement at the flat portion 14 and reaches over to engage the door button 19 in the notch 22. By then exerting upward force on the implement or by rotating the implement in a counterclockwise direction, as viewed in FIG. 8, namely, counterclockwise around the longitudinal axis of the implement, the laterally directed slot or notch 22 moves upwardly sufficiently so that its edge engages under the enlarged head portion 18 of the button 19, exerting upward force thereon and thereby causing the button to be raised to unlocking position. In performing this operation, the corner of flat portion 13 opposite the notch 22, or the longitudinal edge of the flat portion 13 opposite said notch may be employed as a fulcrum for elevating the button.

Similarly, when it is desired to move the button 19 downwardly towards locking position, the operator grabs the end portion 13 and reaches over so as to engage the top portion 18 of the button in one of the recesses 17, after which the operator exerts downward force on the implement to depress the button to its locking position. The provision of the recesses 17, 17 enables the operator to positively engage the button, since the top portion 18 of the button is conformably receivable in one of said recesses 17.

As will be apparent from FIG. 8, the implement provides access by the operator to the locking button of the remote front door 25, or similarly, to the locking button of the right rear door of the vehicle, without the necessity of the operator shifting his position or unfastening his seat belt, and without requiring packages or passengers beside the operator to be disturbed. In the typical case illustrated in FIG. 8, the space beside the operator is occupied by a package and by an infant supported in a typical travel seat. It will be readily apparent that by using the implement 11 in the manner above-described the driver of the vehicle can operate the door locking button 19 conveniently and rapidly without requiring any rearrangement of the adjacent infant or package and without requiring the operator to move from the driver's position. As above-mentioned, the implement can be used to quickly lock the remote door to prevent entry of the vehicle by undesired persons, for example, where the vehicle is stopped for a traffic light or other similar situation, where the operator is in driving position secured with a seat belt. Similarly, the implement 11 may be employed to rapidly unlock the right front door 25, or the right rear door of the vehicle to admit an intended passenger, without the necessity of the operator unfastening his seat belt.

The implement may also be employed for moving packages or other objects from the back seat or floor within reach of the implement, by employing the hook 21 to engage with the desired package or object, so that said desired package or object may be lifted thereby and conveyed to the front seat. As will be readily apparent, to thus employ the implement, the user grasps the flat portion 13 and reaches for the object or package, employing the hook 21 to engage therewith.

While a specific embodiment of an improved automobile door button-operating implement has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An automobile door button-operating implement comprising an elongated relatively rigid bar-like member having opposite flat surfaces adjacent one end thereof with a pair of recesses formed in said flat surfaces, each said recess being adapted to fit over and receive the head portion of an automobile door locking button to enable an automobile operator to reach and engage a remote door locking button and depress the button to locking position, and wherein the bar-like member is formed adjacent one of the ends thereof with a notch in the form of a laterally opening slot adapted to receive an automobile locking button to enable the operator to raise the button to unlocking position, said bar-like member being formed adjacent said pair of recesses with a hook which faces laterally at the edge of said bar-like member, said hook being adapted to engage a package to raise or lower the same.

2. The implement of claim 1, and wherein said laterally opening slot forming said notch is disposed in the end of the bar-like member opposite said end in which the pair of recesses are disposed.

3. An automobile door button-operating implement comprising an elongated, relatively rigid bar-like member having opposite flat surfaces and perimetrical edge surfaces, a recess formed in one of said flat surfaces near one end of the bar-like member and adapted to fit over and receive the head portion of an automobile door locking button to enable an automobile operator to reach and engage a remote door locking button and depress the button to locking position, said recess being formed as a shallow depression having a spherical bottom surface for engaging a rounded top end of the door locking button, and wherein the bar-like member is formed adjacent one of the ends thereof with a slot opening through one of said edge surfaces and adapted to receive an automobile locking button to enable the operator to raise the button to unlocking position.

4. An automobile door button-operating implement according to claim 3, wherein the slot comprises an outer portion having parallel walls spaced to slidably receive the shank of a door locking button, and a semicircular inner portion having a diameter smaller than the head of the door locking button.

5. An automobile door button-operating implement according to claim 4, wherein said slot is oriented to extend perpendicularly relative to a longitudinal edge of the bar-like member through which it opens.

6. An automobile door button-operating implement according to claim 5, wherein said bar-like member includes a pair of said button-engaging recesses formed in the opposite flat surfaces of the bar-like member adjacent one end thereof.

7. An automobile door button-operating implement according to claim 6, wherein a hook is formed in said bar-like member adjacent said pair of recesses, said hook facing laterally at an edge of said bar-like member and being adapted to engage a package to raise or lower the same.

* * * * *